United States Patent [19]

Cooper

[11] Patent Number: 5,543,743
[45] Date of Patent: Aug. 6, 1996

[54] ADJUSTABLE REFERENCE SIGNAL DELAY DEVICE AND METHOD

[76] Inventor: J. Carl Cooper, 15288 Via Pinto, Monte Sereno, Calif. 95030

[21] Appl. No.: 461,093

[22] Filed: Jun. 5, 1995

[51] Int. Cl.$^6$ ................................................ H03H 11/26
[52] U.S. Cl. ........................ 327/263; 327/161; 327/241; 327/265
[58] Field of Search ................................. 327/161, 241, 327/263, 265

[56] References Cited

U.S. PATENT DOCUMENTS 5,416,814   5/1995   Gibbs et al. ............................ 327/265

FOREIGN PATENT DOCUMENTS

| 352025552 | 2/1977  | Japan | 327/263 |
| 360067869 | 4/1985  | Japan | 327/265 |
| 360257616 | 12/1985 | Japan | 327/265 |
| 402214807 | 8/1990  | Japan | 327/265 |

Primary Examiner—Margaret Rose Wambach
Attorney, Agent, or Firm—J. Carl Cooper

[57] ABSTRACT

The apparatus and method described herein provides for generating a delayed reference in response to a received reference. The occurrence of a first event in the received reference is detected and a delay period started in response thereto. At the end of the delay period a reset is generated. A delayed version of the received reference is then generated in response to the reset. In addition, a delayed signal is generated to steer a companion delay to the same value.

18 Claims, 2 Drawing Sheets

ADJUSTABLE REFERENCE SIGNAL DELAY DEVICE AND METHOD

BACKGROUND OF THE INVENTION

The invention relates to the use of timing reference with devices which accept such signals provided from an internal or external source. The invention is of particular use in television systems where it is frequently desired to provide video delays which may be automatically or operator adjusted from time to time while at the same time maintaining synchronization of an associated audio or other signal. Other uses and purposes for the present invention will also become known to one skilled in the art from the teachings herein.

1. Field of the Invention

The field of the invention includes the use of timing reference signals having particularly long sequences as related to their shortest transition. Various devices accept such signals provided from an internal or external sources and operate to adjust their internal mechanisms accordingly. It is frequently desired to provide adjustment of such timing reference signals.

2. Description of the Prior Art

It is well known in television systems to provide for timing adjustment of the television signal by distributing a common timing reference comprised of one or more signals throughout the facility. This timing signal is frequently called black burst and color black. Each video processing device in the facility receives this timing reference, operating to output its video signal in synchronism with this reference. Frequently, it is desirable to have some adjustment in the phase between the output video signal and the reference signal and this adjustment is provided within the video processing device. These adjustable delays typically are limited in range, with the largest limited to around 3 horizontal lines (≈200 µs). It is also known to provide adjustable delays for video by means of switched analog or digital delay lines. As with the devices above, this adjustment if limited in range. Additionally, it is known to provide automatically adjustable delays of video signals in Time Base Corrector and Video Frame Synchronizer devices such as described in U.S. Pat. Nos. 3,860,952 and 4,018,990. These devices digitize an incoming video signal according to the sync thereon, store the digitized video into a memory and read the stored video out of memory according to the reference signal. A limited amount of operator adjustment is frequently provided to allow phase variations to be introduced between the output video signal and the reference in order to accommodate delays to the video signal elsewhere in the facility, such as delays due to cabling. Normally, the above described adjustments in phase between the reference and the output video signal are operator type and require some skill and specialized procedures for the operator to perform, thus making frequent adjustment difficult. In addition, due to the relatively small adjustment range provided by the equipment, there are limitations on the amount of external delay which can be accommodated by operator adjustment.

OBJECTS AND DISCLOSURE OF THE INVENTION

The invention described herein provides for a method and apparatus whereby the reference signal which is provided to video equipment may be rapidly and automatically adjusted, thereby providing for quick compensation of system timing changes without requiring an operator to adjust the video processing equipment itself. The invention may provide a plurality of preadjusted timing settings which the operator sets once and which may then be stored for future use. The invention may also provide for remote control of timing by other devices or operators physically removed from the invention or the video device which it is operated with. Further, the invention provides a delay steering output such as a Digital Delay Output (DDO) which may be utilized by a companion audio delay to cause a companion audio or other signal to be delayed by the same amount as the video signal which is being adjusted. Other objects and features of the invention will be apparent to one of ordinary skill in the art from the teachings herein.

DESCRIPTION OF THE PREFERRED EMBODIMENT

Figure 1:
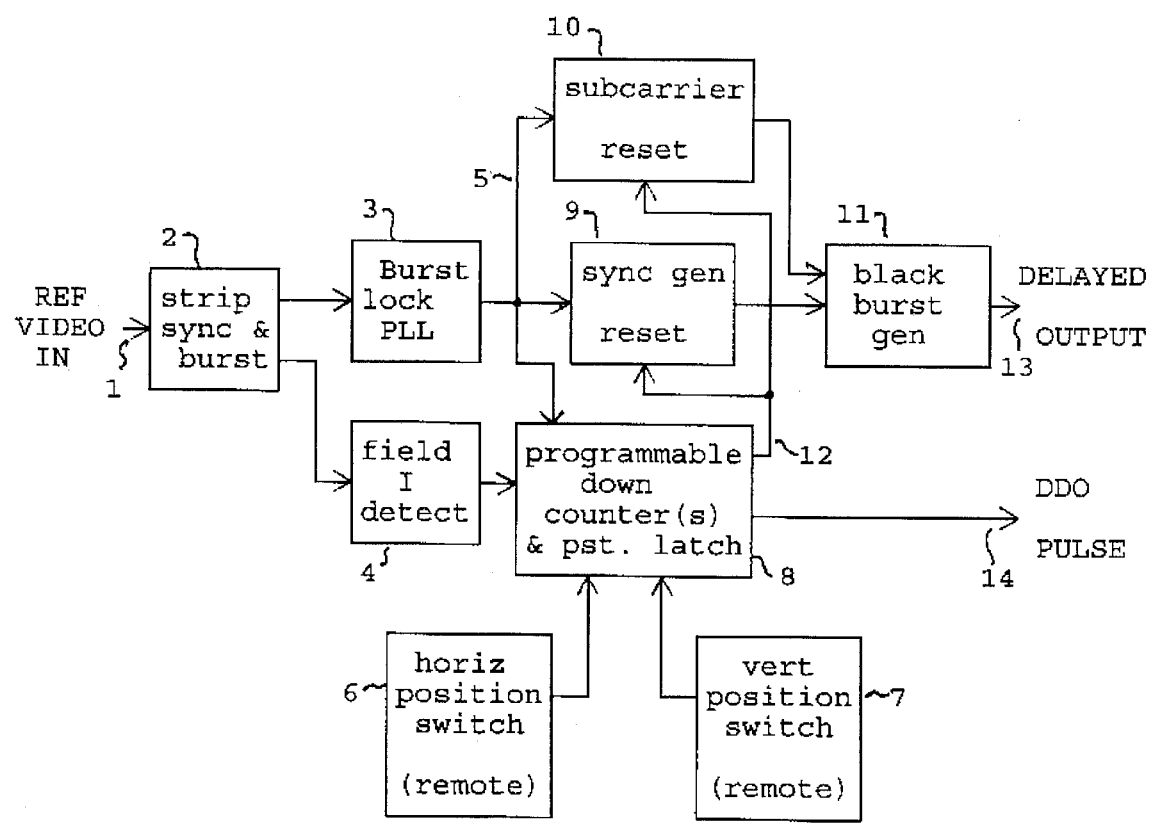
FIG. 1 is a block diagram of the preferred embodiment of the invention.

FIG. 1 is a drawing of the preferred embodiment of the invention having a reference video input 1 coupled to a burst and sync stripper 2 providing sync and burst related signals to a burst locked PLL 3 and a color field I detector 4, with a horizontal position switch and remote control interface 6 and a vertical position switch and remote control interface 7, both providing delay (or phase) information to a programmable down counter circuit 8 which receives a field one pulse from 4, clock signal 5 and providing a reset output 12 and further providing a delay steering signal output 14, with FIG. 1 further showing a resettable sync generator 9 and subcarrier generator 10, both receiving a burst locked clock 5 from 3, and a black burst generator 11 providing a delayed reference signal output 13 in response to 9 and 10. While only one connection is shown between blocks it will be recognized that these represent multiple signals which are coupled from block to block as required.

The present invention will now be described by way of example with respect to its preferred embodiment as utilized with analog NTSC video signals which is made up of color burst, horizontal syncs, defining horizontal lines, and vertical syncs defining fields. As is well known in the art, in video like and many other reference signals a sync component defines a negative period determined by a negative transition followed by a positive transition, and a positive period determined by a positive transition followed by a negative transition. It will be appreciated that these periods may be maintained in the delayed reference signal such that equipment to which it is coupled will recognize the delayed reference the same as it would recognize the input signal. As is well known in the art, the NTSC video signal has a period of 4 fields which fields are defined by the relative relationship of horizontal sync, vertical sync and color burst phase. Throughout this 4 field sequence, each and every one of the 1050 video lines has a particular characteristic which can be defined by that line's horizontal sync phase relationship to vertical sync and the line's burst phase relationship to the horizontal sync. That relationship repeats every 4 fields. By convention, the four fields are labeled I, II, III and IV, the definition for the start of which is provided by the SMPTE recommended practice RS170A. It is this unique repeating relationship which causes the need for synchronizing multiple video signals and by which a particular event may be identified. The phase, or timing of the reference may be defined or identified by the occurrence of a particular sequence of individual components or parts of the reference signal. With respect to the description of the preferred embodiment, the start of color field I will be used. It will be recognized from the teachings herein that it is desirable to utilize an event which occurs only once, or is otherwise unique within the period of the reference.

While the invention is described by way of example with respect to the preferred embodiment used with analog NTSC video signals. It will be understood however that one of ordinary skill in the art will be able to practice the invention with virtually any other types of analog or digital signal which is used as a reference, provided that reference signal has at least one particular event which can be identified. In particular, the present invention may be used with other video signals, for example analog PAL (which has an 8 field sequence) and digital D1, D2 and other video type signals.

It may also be noted that while the period of the reference is normally thought of as a value of time, it may just as well be defined or measured by other units which themselves may or may not be regular, and the use of period and related words is defined herein in that broader sense. For example, periods may be defined in units of clock cycles where the clock may change frequency. Additionally, the periods may be defined in units of scan lines where the scan lines may be only abstractly implied such as in a compressed video data stream. One useful such system is MPEG compressed video where periods related to the video are defined by varying times and clocks which are dependent upon the complexity of the video image.

In FIG. 1, sync and burst stripper 2 operates to receive the reference, which in this example is an analog NTSC reference video signal via input 1 and separate therefrom the sync and burst components as well as providing other signal related timing signals to 3 and 4. The reference may be a typical timing reference such as black burst, or may be a program type video signal.

Burst locked PLL 3 provides a digital clock signal 5 which is preferred to be 4 times the burst frequency or 14.3 MHz for use by 8, 9 and 10. Field I detector detects the occurrence of a particular event in the reference, in this example the start of color field I, by comparing the relationship between burst, horizontal and vertical sync. It will be recognized that color field I is selected for convenience and other particular occurrences of events in the reference signal may be detected as well. Upon detecting the occurrence of field I, 4 outputs a pulse which is preferred to have a duration of 1 clock cycle of the 14.3 MHz clock 5 from 3. Since 3 is locked to burst, and burst is also coupled to 4, the generation of such a pulse is easily performed, however it is also possible to couple the clock 5 or other signals between 3 and 4 as convenient.

The Field I pulse from 4 is coupled to the programmable down counter circuit 8 which may actually be comprised of two or more separate counter circuits for operator convenience as will be described below. The down counter loads or presets to a digital number supplied by 6 and 7 in response to the Field I pulse and immediately begins counting down in response to the clock 5. When the down counter reaches zero it generates a terminal count pulse which causes a reset pulse 12 to be generated. The counter then stays inactive until the next field I pulse is received.

The down counter acts as a programmable delay, or programmable timer, serving to delay the reset pulse by a number of clock cycles, integral or fractional, which number is determined by the horizontal and vertical position switches 6 and 7. If the clock is a fixed frequency then the delay period will be a time period defined by the frequency and number of clock pulses counted. Since the clock is phase locked to the reference its frequency and thus the delay time may vary.

It will be understood that while the function of 12 is described as delaying the pulse from 4 to provide a delayed pulse 12 that numerous other circuit arrangements for achieving this result may be resorted to as well. Some examples include use of a tapped delay line to delay the field I pulse and where a particular tap is selected to connect the delayed pulse to provide reset 12, by use of multiple fixed delay lines which are switched in and out of a series delay circuit, by use of charge or discharge times of inductors or capacitors (which provides a time delay), or by other means as will be known from the teachings herein. It is intended that the term delay as utilized in the present description and claims be defined as including timers, and other types of devices or methods which provide an output event a known time or number of clocking or counting events after an input event, wherein the output and input events may be the same or different. It may also be noted that while it is preferred to utilize a phase locked clock, a fixed frequency clock or other variable, interrupted or sporadic clocking may be utilized as well.

At the end of the delay period, 8 outputs a delayed reset pulse 12 which is used to reset subcarrier generator 10 and sync generator 9. It is preferred that 9 and 10 be reset to the same state of sync and subcarrier as exists on the input reference 1 at the time of detection of color field I and associated generation of the field I pulse by 4. In this fashion, the occurrence of the generation of color field I by 9 and 10 is delayed from the occurrence of color field I at the input 1 by the amount of delay in 8 as selected by 6 and 7.

As previously mentioned, it is preferred that 8 be comprised of two or more counters. The first counter is configured to count clock cycles and sub clock cycles along a video line, as controlled by the horizontal position switch 6. In this fashion the timing of the output signal at 13 may be controlled along the horizontal scan line to achieve proper color and horizontal timing to sub clock accuracy. The sub clock accuracy will require a phase shift of the counting circuit, such as by use of a digitally programmable delay line, or counting of a multiple frequency of clock 5 or generated internally in 8 as is convenient. It is desired to provide such sub clock accuracy in order to provide for both horizontal timing and color subcarrier (burst) timing as is often needed.

In a fashion similar to 6, the vertical position switch 7 provides a number to a second counter which counts the number of lines of delay imparted to the reset pulse. The order of counting is of little consequence and one may be performed before the other as is convenient. It is preferred however that the vertical counter count first, delaying the reset pulse from 4 by an integral number of lines, which upon reaching the delay defined by 7 starts the horizontal counter which upon reaching the delay defined by 6 generates the reset pulse 12.

It is also possible to control the phase of the clock 5 which is applied to 9 and 10 in order to finely control the phase of 13 over a clock cycle range. An electronically controlled delay line is suitable for this purpose and may be incorporated into 3 or alternatively into 9 and/or 10. The control of the delay line may be by part of the switches in 6, or alternatively may be provided by an additional switch similar to 6.

Programmable down counter 8 is also preferred to include a S-R (set-reset) latch which is set high by every Nth field I pulse from 4 and reset low by the following reset pulse 12. In this fashion an industry standard DDO pulse is generated having a period of N field I periods during which the high period is equal to the delay. It is preferred that N be equal to 2. The DDO pulse at 14 may then be utilized by a companion audio or other delay to delay an associated signal by an amount equal to the video delay.

While it has been suggested that switches be used in the preferred embodiment of 6 and 7, it will be recognized that other forms of control may be adapted as required, including analog controls by potentiometer driving A-D convertors and remote control interface which provides for loading of the registers of the down counters via a communications link, thus providing the wanted binary numbers for 6 and 7. Combinations may be utilized as well, for example a bank of switches controlling a programmable delay line for sub clock phase delay of 12, and a potentiometer driving an A-D which outputs digital numbers held in a latch to provide horizontal clock delays and vertical line delays.

Of particular interest is a system where the delay numbers 6 and 7 are provided by a several sets of switches 6 & 7 with a particular set being selected by equipment in the television system in order to control the delay as the television system configuration is changed. In particular television production switchers provide tally light signals which indicate which input is selected and also indicating the use of special signal processing paths. These tally signals can be used to control the selection of particular sets of switches in order to cause the delay period to track the delay of various video signals through the production switcher. This is very useful for providing delay tracking of chroma key signals for use in a downstream keyer to ensure the proper positioning of the key signal as the production switcher video path length is changed by the operator.

The sync generator is clocked by clock 5 to provide composite sync, and is reset to its color field I condition by the reset pulse 12. The subcarrier generator 10 generates a 3.58 MHz color subcarrier which is also reset to its color field I condition by the reset pulse 12. The composite sync from 9 and color subcarrier from 10 are utilized by the black burst generator 11 to generate an industry standard black burst signal 13. In this fashion the aforementioned delayed reference signal is provided.

The delayed reference 13 may then be utilized by a video generating or processing instrument, and the video output therefrom controlled by the invention to provide desired timing of the video in a system or facility. Of special utility is the use of the present invention when a program type video signal which is input to a video frame synchronizer is also coupled to 1. The reference from 13 is a delayed reference version thereof and may be coupled to the reference input of the video frame synchronizer, thereby providing an adjustable fixed or variable video delay, and via 14 a matching delay for one or more companion signals, all under control of the invention. In particular, in the previously described use of the invention with tally signals from a production switcher this coupling with a video frame synchronizer will enable the program type video signal to be delayed by selectable amounts in response to the tally signals, thus providing video delay compensation for the changes in video system path length.

One of ordinary skill in the art will be able to construct and practice the invention from the description given herein taken in conjunction with the drawings. For example, in FIG. 1 element 2 may be provided by an Elantec EL4583C with a few external components available from Elantec Corporation of Milpitas, Calif. Element 3 may be provided by an RCA (Harris) CA3126 available from Harris Corporation, Melbourne, Fla. Element 4 may be constructed by converting burst to TTL levels with a comparator and latching the TTL burst with a slightly delayed leading edge of the back porch clamp signal from the EL4583 from 2. The output of this latch is a high or low signal which corresponds to the burst phase for that line. The burst phase signal is delayed 3 H in a serial shift register clocked with H sync from the EL4583 and the 3 H delayed burst phase signal latched with the positive edge of the odd-even signal from the EL4583. The output of this latch is a four field square wave of which the leading edge can be used to trigger a oneshot to generate the Field I pulse. Elements 6 and 7 may be provided with standard binary switches in any mechanical or electrical form desired, or via remote control circuitry as previously discussed. Element 8 may be provided by any parallel loadable down counter IC, such as the 74HC169 available from multiple IC vendors. The DDO pulse generator may be implemented with a common S-R latch as previously described. The subcarrier generator 10 may be provided by a simple resettable ÷4 counter whose output is coupled to a 3.58 MHz bandpass filter. The sync generator 9 may be implemented with a Philips SAA1101. It should be noted that this IC requires a 5 MHz input clock which can be provided by a PLL which locks to the 14.3 MHz clock in a 63/88 ratio. The black burst generator is simply implemented by gating subcarrier on during burst flag provided by 9 and combining that gated subcarrier with composite sync from 9. Of course with all of the above circuits proper levels, speed and timing considerations must be observed, however such considerations are well within the capability of one or ordinary skill in the art from the teachings herein.

Figure 2:
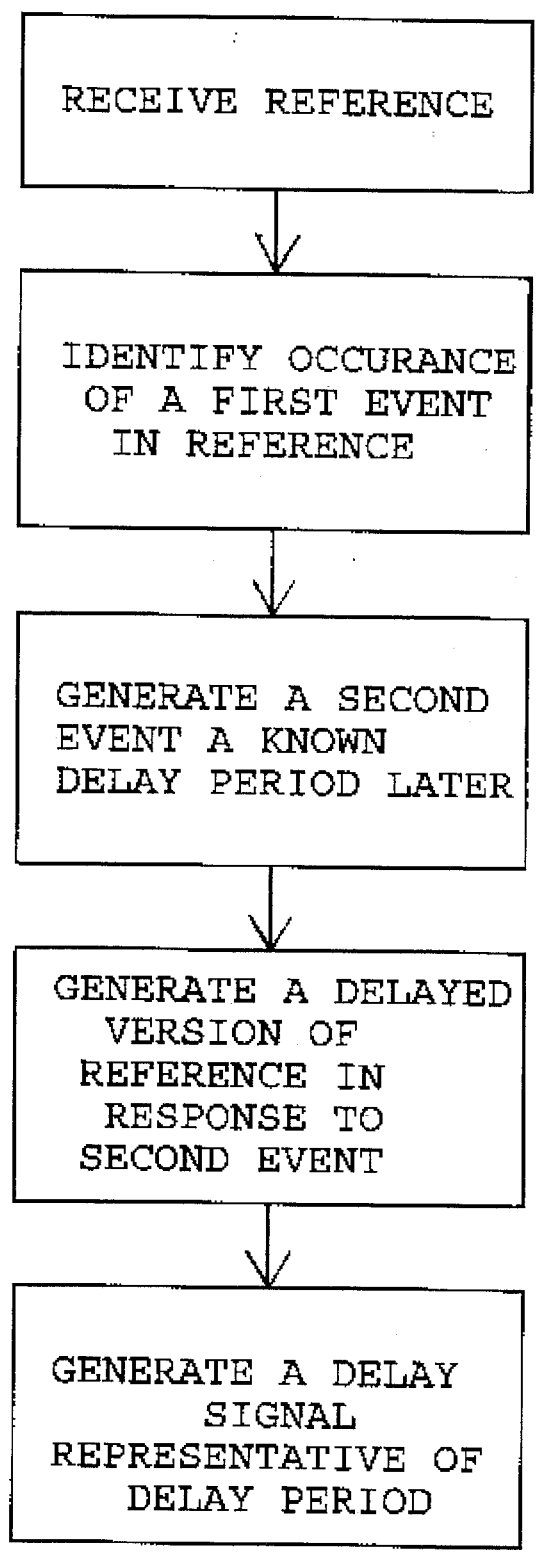
FIG. 2 shows a representative flow chart of the method of carrying out the invention.

FIG. 2 shows a representative flow chart of the method of carrying out the invention. A reference signal, which is preferred to have at least one repeating periodic characteristic having a period and a periodic rate, is first received. The occurrence of a first event in the reference is then identified. It is preferred that the first event be a unique event which is repeated at the periodic rate and occurs only once during each period. In response to the occurrence of the first event a delay period is started at the end of which a second event is generated. The delay period may be a time period or may be a period defined by other measures, such as for example the passing of a known number of clock cycles, the period of which may be variable or even erratic. The delay period is preferred to be defined the passing of a known number of clock cycles which clock is responsive to the received reference such that a known number of clock cycles occur during the period of the reference. In response to the generation of the second known event, a delayed version of the reference is generated, this delayed version being the result of the method. The delayed version of the received reference is preferred to have at least one repeating periodic characteristic having a period and a periodic rate all of which are similar to those of said received reference. It is preferred that the delayed version be generated in response to the received reference in order that the delayed reference has precisely the same period as the received reference, and in particular it is preferred that the delayed reference be generated in response to the above mentioned clock with the second event controlling the phase of the repeating period of the delayed reference.

In response to said first event and second event a delay signal representative of said delay period is generated. It is preferred that said delay signal be representative of said delay period by having a repetition period which is a multiple N of said period of said received reference where N is preferred to be 2. It is also preferred that said delay signal take on a first value for the same period as said delay period and a second value during the remainder of said repetition period. Alternatively, said delay signal may be any other type of signal over which the value of said delay period may be communicated, for example an electronic or optical signal communicating via digital data.

The invention described herein by way of explanation of the preferred embodiment may be practiced with numerous changes in the arrangement, structure and combination of the individual elements, as well as with substitution of equivalent functions and circuits for the elements in order to optimize the invention for a particular application, all without departing from the scope and spirit of the invention as hereinafter claimed.

What is claimed is:

1. A method of providing a delayed reference in response to a received reference which includes at least a first period determined by a positive followed by a negative transition and a second period determined by a negative followed by a positive transitions including the steps of:

receiving said reference, identifying the occurrence of a first event in said received reference, starting a delay period in response to said occurrence of said first event, generating a second event at the end of said delay period, generating a delayed version of said received reference in response to said second event wherein said first and said second periods are delayed in response to said second event.

2. A method as claimed in claim 1 wherein said delay period is a time period, said received reference has a repetition period and said first event is an event which occurs only once, or is otherwise unique within said repetition period.

3. A method as claimed in claim 1 wherein said received reference has at least one repeating periodic characteristic having a period and a periodic rate, with said first event being a unique event which occurs only once during each said period and is repeated at said periodic rate, and said delayed version of said received reference has at least one repeating periodic characteristic having a period and a periodic rate all of which are similar to those of said received reference.

4. A method as claimed in claim 3 wherein said delay period is a period defined by the passing of a known number of cycles of a clock which clock is responsive to said received reference such that a known number of clock cycles occur during said period of said received reference.

5. A method as claimed in claim 4 wherein said delayed version of said received reference is generated in response to said received reference in order that said delayed reference has precisely the same period as said received reference.

6. A method as claimed in claim 4 wherein said delayed version of said received reference is generated in response to said clock with said second event controlling the phase of the repeating period of the delayed reference.

7. A method as claimed in claim 1, 2, 3, 4, 5 or 6 including the further step of generating a delay signal representative of said delay period.

8. A method as claimed in claim 7 wherein said delay signal has a repetition period which is a multiple N of said period of said received reference where N is a positive integer and said delay signal takes on a first value for the same period as said delay period and a second value during the remainder of said repetition period.

9. A method as claimed in claim 7 wherein said delay signal is an electronic or optical signal communicating said delay period via digital data.

10. An apparatus for providing a delayed reference in response to a received reference which includes positive periods and negative periods including:

a circuit for receiving said reference, a circuit for identifying the occurrence of a first event in said received reference, a delay circuit responsive to said occurrence of said first event to start a delay period and generating a second event at the end of said delay period, a circuit for generating a delayed version of said received reference wherein both said positive periods and said negative periods are delayed in response to said second event.

11. An apparatus as claimed in claim 10 wherein said delay period is a time period.

12. An apparatus as claimed in claim 10 wherein said received reference has at least one repeating periodic characteristic having a period and a periodic rate, with said first event being a unique event which occurs only once during each said period and is repeated at said periodic rate, and said delayed version of said received reference has at least one repeating periodic characteristic having a period and a periodic rate all of which are similar to those of said received reference.

13. An apparatus as claimed in claim 12 further including a clock generation circuit responsive to said received reference to generate a clock such that a known number of clock cycles occur during said period of said received reference and wherein said delay period is a period defined by the passing of a known number of cycles of said clock.

14. An apparatus as claimed in claim 13 wherein said delayed version of said received reference is generated in response to said received reference in order that said delayed reference has precisely the same period as said received reference.

15. An apparatus as claimed in claim 13 wherein said delayed version of said received reference is generated in response to said clock with said second event controlling the phase of the repeating period of the delayed reference.

16. An apparatus as claimed in claim 10, 11, 12, 13, 14 or 15 wherein said delay circuit also generates a delay signal representative of said delay period.

17. An apparatus as claimed in claim 16 wherein said delay signal has a repetition period which is a multiple N of said period of said received reference where N is a positive integer and said delay signal takes on a first value for the same period as said delay period and a second value during the remainder of said repetition period.

18. An apparatus as claimed in claim 16 wherein said delay signal is an electronic or optical signal communicating said delay period via digital data.

* * * * *